US006821311B1

(12) United States Patent
Karonen et al.

(10) Patent No.: US 6,821,311 B1
(45) Date of Patent: Nov. 23, 2004

(54) METHOD FOR TREATING FERTILIZER PROCESS SOLUTIONS

(75) Inventors: Janne Karonen, Helsinki (FI); Anders Weckman, Espoo (FI)

(73) Assignee: Kemira Growhow Oy, Helsinki (FI)

( * ) Notice: Subject to any disclaimer, the term of this patent is extended or adjusted under 35 U.S.C. 154(b) by 296 days.

(21) Appl. No.: 10/030,263

(22) PCT Filed: Jul. 6, 2000

(86) PCT No.: PCT/FI00/00623

§ 371 (c)(1),
(2), (4) Date: Apr. 8, 2002

(87) PCT Pub. No.: WO01/04048

PCT Pub. Date: Jan. 18, 2001

(30) Foreign Application Priority Data

Jul. 8, 1999 (FI) .................................................. 991563

(51) Int. Cl.⁷ ............................. C05B 9/00; C05B 11/10
(52) U.S. Cl. .............................................. 71/28; 71/34
(58) Field of Search ....................................... 71/28, 34

(56) References Cited

U.S. PATENT DOCUMENTS

| | | | |
|---|---|---|---|
| 3,333,939 A | | 8/1967 | Davis et al. ................... 71/29 |
| 3,713,802 A | | 1/1973 | Gittenait ........................ 71/29 |
| 3,723,086 A | * | 3/1973 | Poynor et al. .................. 71/29 |
| 3,974,262 A | * | 8/1976 | Crerar et al. ................. 423/313 |
| 3,985,538 A | * | 10/1976 | Hicks et al. ................... 71/34 |
| RE29,149 E | * | 3/1977 | Young ......................... 423/313 |
| 4,017,588 A | * | 4/1977 | Davidson ..................... 423/313 |
| 4,134,750 A | * | 1/1979 | Norton et al. .................. 71/29 |
| 4,461,913 A | | 7/1984 | Lewis et al. ................... 564/63 |
| 5,492,553 A | | 2/1996 | Vetanovetz et al. ............. 71/29 |

FOREIGN PATENT DOCUMENTS

| | | | |
|---|---|---|---|
| CA | 939876 | | 1/1974 |
| DE | 2 308 408 | | 8/1974 |
| ES | 8606972 | * | 11/1986 |
| FR | 1558585 | * | 2/1969 |
| JP | 46009211 | * | 3/1971 |
| JP | 49-8498 | | 1/1974 |
| PL | 146 113 | | 8/1987 |

OTHER PUBLICATIONS

Ewell F. Dillard et al., Preparation and Characterization of $FeH_3(PO_4) \cdot 2CO(NH_2)_2$, J. Agric. Food Chem., 1981, 29, 391–396.

C. A. Hodge et al., "Production of high–quality liquid fertilizers from wet–process acid via urea phosphate", *Fertilizer Research*, 39:59–69, 1994.

Dewert's Abstract, No 0 –29035B/15, Week 0 15, Abstract of SU, 608–519 (Polyakov EV), Apr. 13, 1978.

* cited by examiner

Primary Examiner—C. Sayala
(74) Attorney, Agent, or Firm—Birch, Stewart, Kolasch & Birch, LLP

(57) ABSTRACT

A method for manufacturing a solid product containing nitrogen and phosphor, particular a solid ammonium phosphate and/or urea ammonium phosphate product, in which method the solution containing urea and phosphoric acid is heated. Water then evaporates from the solution and the urea in the solution decomposes into ammonia and carbon dioxide. The carbon dioxide exits the reactor together with water vapor; the generated ammonia neutralizes the phosphoric acid. A suspension containing ammonium phosphate and/or urea ammonium phosphate is obtained, which is solidified, dried, crushed, ground and/or granulated. The end product as such can be used as a fertilizer or it can be used as part of a mixed fertilizer.

19 Claims, 2 Drawing Sheets

Flow chart 1

Flow chart 2

METHOD FOR TREATING FERTILIZER PROCESS SOLUTIONS

Figure 1:
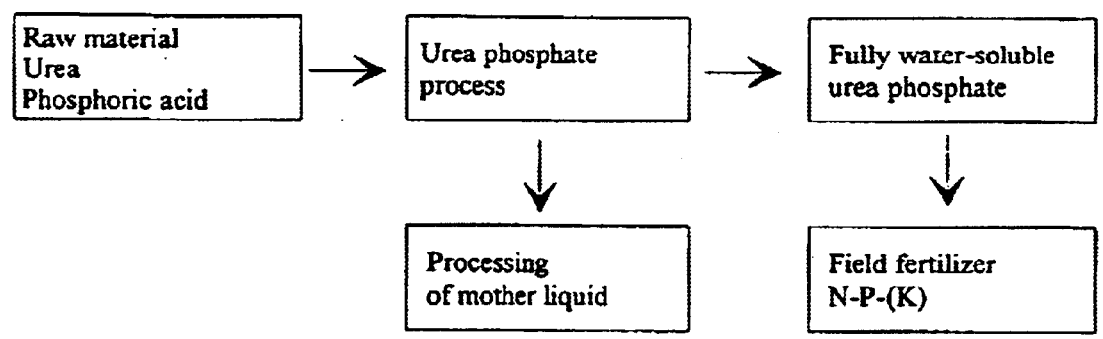

This application is the national phase under 35 U.S.C. § 371 of PCT International Application No. PCT/FI00/00623 which has an International filing date of Jul. 6, 2000, which designated the United States of America and was published in English.

The invention relates to a method for manufacturing a solid product that contains nitrogen and phosphor, especially a solid ammonium phosphate and/or urea ammonium phosphate product from a solution containing urea and phosphoric acid.

The invention is also directed at an ammonium phosphate and/or urea ammonium phosphate product manufactured by the method and its use as a fertilizer either alone or as part of a mixed fertilizer. The invention is also directed at a method for simultaneously manufacturing urea phosphate and a solid ammonium phosphate and/or urea ammonium phosphate containing product.

In the fertilizer process, solutions are formed and used which contain urea and phosphoric acid. As an example, the mother liquid of the urea phosphate process, which contains urea and phosphoric acid, as well as the urea containing scrubber solution of the NPK process to which phosphoric aced has been added, can be mentioned.

In the manufacture of urea phosphate, the impurities originating in the urea and the phosphoric acid used as raw material mainly remain in the mother liquid. We have to accept a low yield percentage of the end product in particular, when we want to manufacture clean, completely water-soluble urea phosphate. In that case, as much as 20 to 40% of the raw material mentioned above can remain in the mother liquid in addition to impurities. Therefore, the productivity of the urea phosphate process is to a great extent affected by how well we can utilize the raw material that remains in the mother liquid.

Various methods have been tested to utilize the mother liquid. For example, we have offered mother liquid as such to fertilizer factories that manufacture field fertilizers. However, mother liquid contains a lot of water, so that the storage and transportation costs of the solution become high, especially if the fertilizer factory is not located in the immediate vicinity of the urea phosphate factory. Furthermore, the hydrologic balance of fertilizer factories is not apt to allow additional water into the process without technical problems that mainly concern granulation, and without economic loss. During storage and transportation, salts can also precipitate from the mother liquid, causing problems in tanks when settling, and blocking tube systems.

As the viscosity of an acidic solution grows when concentrating and the solution becomes very viscous and extremely difficult to treat, concentrating the solution by evaporating water does not solve the problem.

U.S. Pat. No. 4,461,913 describes an improvement on the urea phosphate process, according to which it was possible to decrease the formation of precipitate by adding sulphuric acid, and to slightly increase the performance of the urea phosphate process; however, this improvement did not eliminate the actual problem with the mother liquid. Part of the raw material of the process still remains in the mother liquid.

Mother liquid has also been neutralized by liquefied ammonia and the formed precipitate has been filtered, resulting in a solvent fertilizer and a metalline precipitate (J. Agric. Food Chem., Vol. 29, No. 2,1981). However, liquefied ammonia is toxic and dangerous to handle. Its safe storage, transportation, and use require special containers and treatment equipment that meet the safety criteria, making it difficult to use safely and increasing costs. The solid residual precipitate is still a disadvantage.

Urea phosphate has also been decomposed thermally to form ammonium poly-phosphate (German Patent 2308408) or urea ammonium polyphosphate (U.S. Pat. No. 3,713,802, Fert Res 1994, 39(1), 59–69), which can be used as fertiizers. These products are soluble but polyphosphates as such are not until they are hydrolysed to form orthophosphate, a form useful for plants. This hydrolysing is dependent on external conditions and typically slow. The original material used in these processes was pure urea phosphate and not impure mother liquid.

To avoid the problem with impurities, attempts have been made to in advance purify the phosphoric acid used as raw material (Jap. pat 49-8498). However, removing impurities from phosphoric acid is a separate, expensive process.

Furthermore, attempts have been made to render mother liquid a suspension that could be used as such (CA 112:20428, PL 146113B2, Fert Res 1994, 39 (1), 59–69) by adding clay mineral and other nutrients. However, the suspension thus obtained still continues a lot of water, limiting its use to the immediate vicinity. Moreover, special equipment is required to spread it in the fields.

The present invention is directed at a method for manufacturing a solid product containing nitrogen and phosphor, especially an ammonium phosphate and/or urea ammonium phosphate product from process solutions containing urea and phosphoric acid; for example, from the mother liquid of a urea phosphate process or from the scrubber solution of the NPK process to which phosphoric acid has been added, by heating the said solution in a reactor, so that the urea contained by the mother liquid is decomposed into ammonia and carbon dioxide. The carbon dioxide and the forming water vapour are evenly removed from the reactor by suitable agitation and, at the same time, effervescence/foaming is prevented.

The ammonia generated by the decomposition neutralizes the phosphoric acid in the mother liquid, so that a suspension containing ammonium phosphate and/or urea ammonium phosphate is generated, possibly also containing other salts, phosphates or sulphates, for example, depending on the origin of the initial material used.

The suspension thus obtained is solidified by cooling, dried, crushed, ground, and/or granulated to form a product that contains nitrogen and phosphor, an ammonium phosphate and/or urea ammonium phosphate product in particular.

The invention is also directed at a solid product containing nitrogen and phosphor, manufactured by the method, an ammonium phosphate and/or urea ammonium phosphate product in particular, and its use as a fertilizer either alone or as part of a mixed fertilizer.

We observed that the urea and the phosphoric acid of various process solutions containing urea and/or impure phosphoric acid, as well as the other salts possibly contained by them as impurities, such as sodium salt, potassium salt, calcium salt, magnesium salt, iron salt, manganese salt, could be utilized by the method according to the invention by manufacturing from them a solid product that dissolved well in water and almost completely in an ammonium citrate solution and contained nitrogen and phosphor, an ammonium phosphate and/or urea ammonium phosphate product in particular. The product as such can be used as a fertilizer or it can be used as raw material in manufacturing mixed fertilizers.

In addition to the mother liquid of the urea phosphate process and the phosphoric acid treated scrubber solution of the NPK process, for example, agricultural residual solutions containing urea, phosphoric acid solutions generated by the surface finish of metal, the solids-bearing phosphoric acid suspensions in the sedimentation of phosphoric acid, or their mixtures are suitable to be used as initial solutions in the method according to the invention. Phosphates precipitated by water purification can also be utilized as part of the feed material.

When e.g. the mother liquid of the urea phosphate process is heated, the following actions can be effected at the same time: 1) evaporation of water, 2) decomposition of urea into ammonia and carbon dioxide, and 3) a neutralizing reaction of the generated ammonia with phosphoric acid. Adjusting the temperature and the reaction time can control these three phases of reaction.

The rate of decomposition of urea mainly depends on the temperature and the pH of the solution. Although urea is decomposed at relatively low temperatures, beginning from about 50° C., the reaction time becomes fairly long, when considering practical applications; especially, if the initial solution has high water content. Raising the temperature to about 80° C. guarantees a sufficient reaction rate and evaporation speed of water.

On the other hand, when the temperature increases to more than 125° C., this causes the formation of unwanted polyphosphates, which as such are not usable as plant nutrients but require a hydrolysis before use. The formation of polyphosphates can be avoided by adjusting the temperature of the reaction solution to about 110–115° C. maximum, for example, by adjusting the pressure used for heating and the heating time. Using over-pressure or vacuum can enhance the adjustment of the reaction temperature and, at the same time, that of the reaction time, when needed. By means of conventional means, the process can use vacuum to evaporate water, so that we can operate at a lower temperature than in normal pressure. Correspondingly, urea can be decomposed in over-pressure with lesser evaporation of water.

In order to manufacture a solid end product containing ammonium phosphate and/or urea ammonium phosphate by using the method according to the invention, the molar ratio (N/P) of the nitrogen of the urea and the phosphor of the phosphoric acid in the initial solution must be 0.85 at the minimum. If the molar ratio is lower, solidification becomes considerably more difficult or it does not occur at all.

In the following, the various stages of the method according to the invention are presented by simplified reaction formulas (1)–(3), and the formation of poly-phosphate by formula (4).

Evaporation of water:

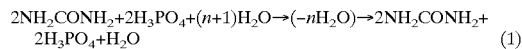  (1)

Decomposition of urea:

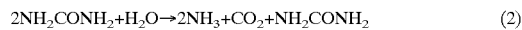  (2)

Formation of ammonium phosphate:

  (3)

Formation of polyphosphate:

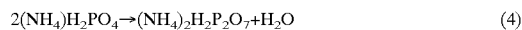  (4)

The method according to the invention can be applied both in batches and as a continuous process either in single or multiple stages. When the method is applied in batches, the molar ratio of the ammonia and the phosphoric acid ($NH_3:H_3PO_4$) at the end of the neutralizing reaction is about 1, increasing, together with the fine-grained compounds, such as iron phosphates that are generated at the beginning of the neutralizing phase, the viscosity of the formed suspension into the range (>1000 cP), in which the suspension is at its toughest and fairly difficult to treat. The removal of water vapour and carbon dioxide from the suspension also becomes more difficult, the risk of effervescence and foaming grows and the water content of the suspension remains fairly high.

These problems are avoided in the continuous process. The neutralizing reaction in particular can be continued past the molar ratio $NH_3:H_3PO_4=1$, and in this way we can decrease the viscosity of the suspension.

It is most preferable to apply the method according to the invention as a continuous, two-phase process, whereby the two-phase aspect may also refer to the use of several successive reactors placed in series. The advantage is mainly achieved because of an easier gas treatment and a superior control of viscosity.

In that case, an initial solution, such as the mother liquid of the urea phosphate process, is heated in a first overflow reactor at 80–125° C., preferably at about 90–100° C., until the majority of the water contained by the initial solution has evaporated and the urea has decomposed, forming about ⅔ of the ammonia required for neutralizing the free phosphoric acid in the solution.

As a consequence of the neutralizing reaction, a suspension containing ammonium phosphate and/or urea ammonium phosphate is generated, the water content of which is 15–20% and which is still so acidic (pH<4) that the ammonia remains in the form of a dissolved ammonium ion. The viscosity of the suspension is typically less than 1000 cP.

At this stage, only water vapour and carbon dioxide in the form of gases exit the reactor. To prevent foaming/effervescence and to ensure a controlled removal of gases, the reaction mixture is constantly agitated and, when needed, a small amount of a conventional anti-foaming agent can be added. By adding water, an increase in viscosity to a harmful range can be prevented, as well as an excessive increase in the temperature.

The suspension is conveyed from the first reactor to a second reactor where heating is continued at about 110–115° C., until the water content of the suspension is low (<10% $H_2O$), pH about 6–6.5, which corresponds to a molar ratio of about 1:3–1.4 of ammonia and phosphoric acid ($NH_3:H_3PO_4$). In that case, the viscosity of the suspension is as low as possible. In addition to water vapour and carbon dioxide, some ammonia gas is released from the reactor, which can be recovered by a scrubber by washing it with mother liquid and returning it to the first reactor.

As evaporating water binds the excess heat, the reaction is safe. However, both reactors must have sufficient mixing in order for the generated gas to easily exit the reaction mixture. The boiling point of the mixture determines the temperature of the reactor, being about 100° C. in the first reactor and about 110–115° C. in the second reactor.

By suitably selecting the retention time, the vapour temperature, and the heating surface area, the three reactions mentioned above can be adjusted to take place as desired. In the first phase, the solution is concentrated to a concentration in which its water content is about 20–40%, and the molar ratio $NH_3:H_3PO_4$ is about 0.7–0.8, and in the second phase to a concentration in which its water content is about 5–10% and the molar ratio $NH_3:H_3PO_4$ about 1.3–1.4.

Finally, the generated, strong solution is solidified by any conventional method used for the manufacture of fertilizers. A sheet-iron belt that can be cooled or heated is very well adapted to solidification. If we want to continue the reaction on the belt, the forward end of the belt can be heated at the same time as its tail is cooled.

The product is preferably and quickly solidified, when the suspension has been spread on the sheet-iron belt or plate as a thin layer and it is cooled to below 60° C. Solidification takes place already in 1–5 minutes, if the thickness of the suspension layer is 2 mm, and in about 20–30 minutes, when it is 10–20 mm.

The solid, plate-like product can be dried, crushed, ground and/or granulated and, when needed, classified by screening; the too rough and fine-grained parts are returned to the second reactor. In addition to the end product, or instead of it, other nutrients or, for example, salts that bind water can be fed into the second reactor.

The end product as such can be used as NP fertilizer, or it can be used for the manufacture of NPK fertilizer, for example, preferably by feeding into the second reactor a suitable source of potassium, such as KCl, $K_2SO_4$ or $K_2CO_3$. Potassium carbonate also has an advantageous effect that enhances neutralization.

$CaCO_3$ or CaO are also effective both as nutrients and additive neutralizers. Furthermore, they advance the drying of the product by binding water. Correspondingly, hemi hydrate $CaSo_4.0.5\ H_2O$ or kieserite (kiseriitti) $MgSO_4.H2O$ both bind water and give nutrients.

The mother liquid contains most of the other nutrients (Ca, Mg, S) and micro-nutrients (B, Cu, Zn, Mn, Fe, Mo, Cl) required, to a sufficient extent, but even if the content of some nutrient were too low, they are easy to add to the second reactor.

If there is a need to bind part of the metals of the mother liquid, for example the iron, to a soluble form, the reaction temperature can be increased to 125° C. so that the desired part of the phosphor is in the form of pyrophosphate, which makes these metals complex.

The physical and chemical properties of the solid end products according to the invention meet the quality requirements made of typical field fertilizers.

Table 1 shows the chemical analysis of the mother liquid of two different urea phosphate processes. Raw material of different origins was used in the processes. The results give a picture of typical amounts of impurities contained by the mother liquid.

TABLE 1

The chemical analyses of the mother liquid

| Compound | | Mother liquid 1 | Mother liquid 2 |
|---|---|---|---|
| Urea-N | (w-%) | 10.8 | 11.1 |
| $NH_4$—N | (w-%) | 0.48 | 1.5 |
| $P_2O_5$-tot | (w-%) | 27.8 | 27.8 |
| Cl | (w-%) | <0.02 | 0.02 |
| F | (w-%) | 0.87 | 0.81 |
| Al | (w-%) | 0.22 | 0.35 |
| Cr | (ppm) | 8.8 | 160 |
| Fe | (w-%) | 0.88 | 0.66 |
| Mg | (w-%) | 1.8 | 1.1 |
| S | (w-%) | 1.2 | 1.3 |
| $H_2O$—KF | (w-%) | 26.7 | 28.2 |

DRAWINGS

FIG. 1. Flow chart 1 describes the simultaneous manufacture of urea phosphate and an ammonium phosphate and/or urea ammonium phosphate product.

Figure 2:
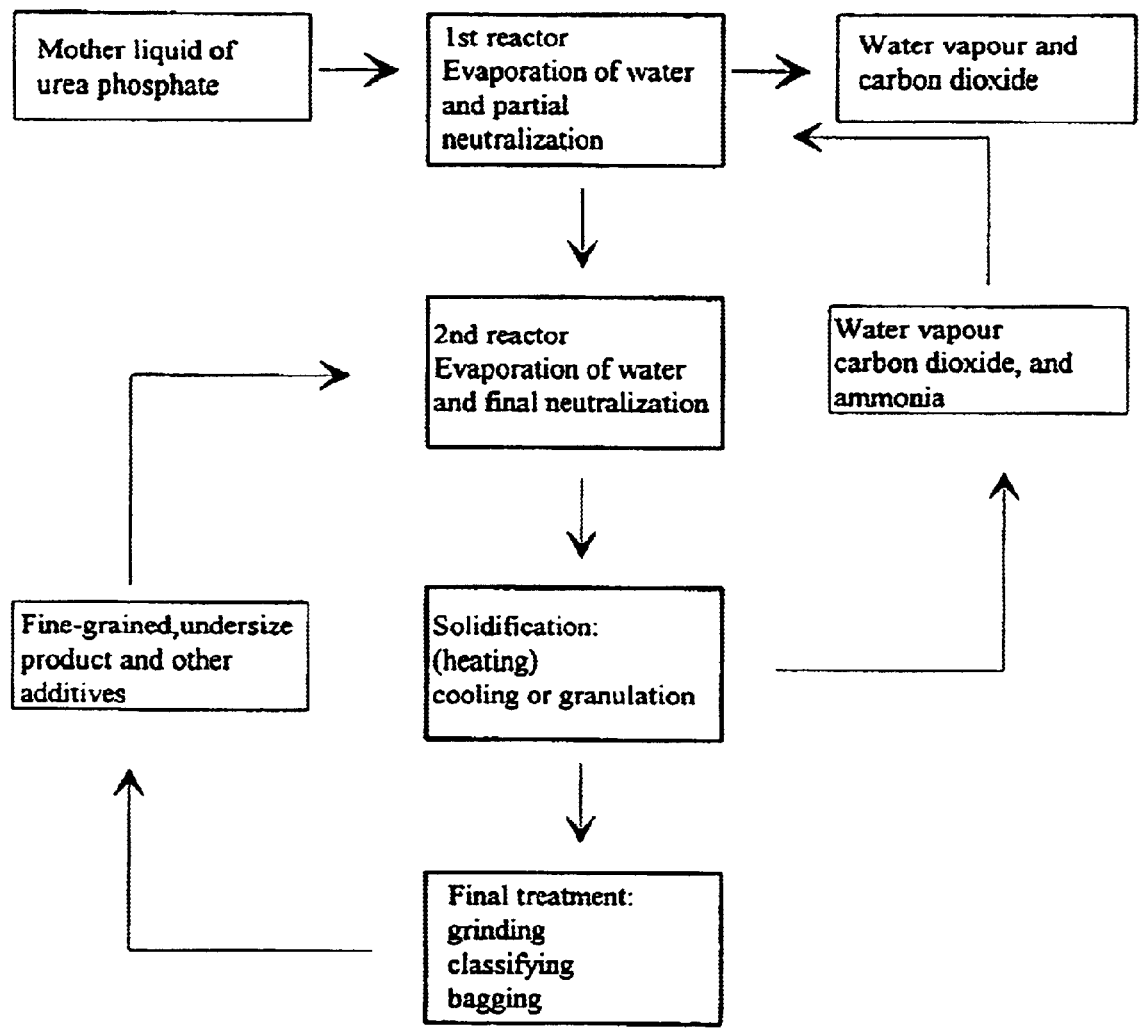

FIG. 2. Flow chart 2 describes in detail the manufacture of the ammonium phosphate and/or urea ammonium phosphate product.

The following examples describe in detail the various alternative implementations of the invention without limiting it.

EXAMPLE 1a

The initial material was urea phosphate mother liquid 2, the chemical analysis of which is presented in Table 1.

The test used a 5-liter overflow reactor that was provided with agitation and jacketing. 5.1 kg of mother liquid with a pH of 2.1 as a 10% solution and a water content of 27.4%, and anti-foaming agent Fennodefo 380 were added to the reactor. First, the temperature of the mother liquid was raised to 100° C. During the first hour, the temperature was raised to 111° C. Along with the decomposition of the urea, the pH increased from 2.1 to 2.7. During the second hour, the temperature was kept stable and the pH increased to 5.4. A little water (0.35 kg) was added because of excessive evaporation.

The test was continued on a continuous-action basis by feeding mother liquid from the urea phosphate process into the reactor at a rate of about 2 kg/hour. At first, a small amount of water was added (0.2 kg). After a three-hour run, the conditions were stabilized (111° C., pH 5.9, 1500 cP, 9.9% $H_2O$). After a one-hour smooth running, the feeding was stopped and the formed suspension was allowed to continue mixing at the same temperature. After twenty minutes, the suspension was clearly thinner (111° C., pH 6.2, 400 cP, 7.8% moisture). When the evaporation time was extended, the viscosity began to increase again and after 40 minutes we started to cool the suspension (111° C., pH 6.4, 1000 cP, 7.6% moisture). When the agitation was stopped, the gas formation was so minor that the swelling of the suspension was no longer a problem.

The suspension was poured on two plates, one of which was cooled (23° C.) with water from below and the other one was at room temperature without cooling. The suspension on the cooled pan started hardening after 11 minutes (47° C.) and had hardened after 27 minutes (35° C.). The other plate was slower to cool and hardened after 64 minutes (46° C.). The solid plates were kept overnight (23° C.), crushed three times by a jaw crusher and analysed (Table 2).

EXAMPLE 1b

This test was conducted in the same way as Test 1a but at a higher temperature. Adding 5 kg of mother liquid to the reactor started the test. During the batch reaction (2 h 40 min), the temperature was raised from 100° C. to 124° C. and the pH increased from 2.1 to 5.8. The steam exiting the reactor was still neutral at the final stage.

The test was continued on a continuous-action basis by feeding about 2.8 kg of mother liquid per hour. After half an hour, 1 kg of water was added, which decreased the temperature for a while. After two hours, the conditions were stable (121° C., pH 6, 800 cP, 12.5% moisture). The reaction was continued for another 3 hours at the same temperature (120–122° C.), during which time the viscosity remained the same (800 cP), the pH increased (pH 6.4), and the moisture decreased (9.7%). The measurements of the final suspension slightly changed (121° C., pH 6.4, 1400 cP, 8.1% moisture), when feeding was stopped.

The suspension was poured on two plates to form layers of about 1 cm, one of which was cooled with water (23° C.) and the other one stayed at room temperature without cooling. The product on the cooled plate had hardened after 24 minutes (37° C.) and in the other pan after 36 minutes (49° C.). The products were kept overnight (23° C.), crushed once by a jaw crusher and analysed (Table 2).

TABLE 2a

The chemical analyses of the end products in Tests 1a and 1b

|  | Test 1a | Test 1b |
|---|---|---|
| N-kok % | 17.0 | 16.5 |
| $NH_4$—N % | 10.3 | 10.6 |
| Urea-N % | 6.4 | 5.5 |
| $P_2O_5$-KM % | 39.3 | 40.0 |
| $P_2O_5$-ASL | 28.3 | 29.0 |
| $P_2O_5$-VL | 39.3 | 39.5 |
| $H_2O$—KF % | 5.8 | 7.6 |
| pH | 6.2 | 6.2 |

On the basis of an X-ray diffraction analysis, the end product contained mono ammonium phosphate, ammonium sulphate, and urea.

TABLE 2b

The physical properties of non-granulated end products
(* The sample was crushed before the analysis)

| Property | Test 1a | Test 1a* | Test 1b | Test 1b* |
|---|---|---|---|---|
| Granular strength [N] | | | | |
| Mean value | 46 | 27 | 29 | 19 |
| Max. 5 | 62 | 33 | 37 | 22 |
| Min. 5 | 29 | 20 | 22 | 16 |
| Abrasion [%] | 1.5 | 1.4 | 2.1 | 1.1 |
| Moisture absorption [%], 80% RH | | | | |
| 2 h | 0.9 | 2.3 | 1.3 | 2.4 |
| 4 h | 1.9 | 4.4 | 2.3 | 4.3 |
| 6 h | 2.6 | 6.2 | 3.3 | 6.3 |

The tests proved that the product was hard enough to be treated and that it was not too pulverulent. The velocities of the moisture absorption were in the same order as those of typical nitrate-based NPK fertilizers.

EXAMPLE 2

The test used urea phosphate mother liquid, the composition of which was.

| | |
|---|---|
| $H_2O$—KF | 40% |
| Urea-N | 10.7% |
| $NH_4$—N | 0.34% |
| P2O5-tot | 24.1% |
| P2O5-ws | 23.2% |
| pH (10% aqueous solution) | 1.7 |

75 g of $CaCO_3$ were added to 1000 g of mother liquid and it was heated at 100–114° C. for one hour. The final moisture was 13% and the pH in a 10% solution was 5.0. The suspension was dried for 3.5 hours at 60° C.
The chemical analysis of the product:

| | | |
|---|---|---|
| $H_2O$—KF | 3.0% | |
| Urea-N | 10.3% | |
| $NH_4$—N | 5.3% | |
| $P_2O_5$-km | 37.7% | |
| $P_2O_5$-vl | 25.4% | (67%) |
| $P_2O_5$-asl | 37.7% | (100%) |
| pH (10%) | 4.9 | |

EXAMPLE 3

A continuous test was conducted by using a 5-liter reactor and by continuously feeding to the heated reactor the same mother liquid as in Example 2, and by simultaneously feeding calcium carbonate. The viscosity was adjusted by adding water. No ammonia could be observed in the exhaust gases. The conditions during the run were as follows:

| | |
|---|---|
| Reaction time | 3.5 h |
| Reactor temperature | 105–110° C. |
| Reactor pH | 4.5–5.0 |
| Moisture of suspension | 10–12% |
| Consumption of carbonate | 135 g/1000 g ML |
| Added water | 185 g/1000 g ML |
| Viscosity | 300 cP |

The suspension was dried at 60° C. and the chemical analysis of the dried product was:

| | | |
|---|---|---|
| $H_2O$—KF | 0.2–1.0% | |
| Urea-N | 9.2% | |
| NH4—N | 6.1% | |
| P2O5-km | 36.4% | |
| P2O5-vl | 28.7% | (78%) |
| P2O5-asl | 36.4% | (100%) |
| pH (10%) | 4.9 | |
| N/P2O5 ratio | 0.420 | |

EXAMPLE 4a

Urea phosphate mother liquid (1.865 kg) of the same quality as in Example 2 was fed into a 2.5-liter reactor that was provided with agitation and heating. Potassium carbonate (417 g) was continuously fed into the reactor and the suspension was agitated at 60° C. for 1.5 hours, so that the pH of the suspension (a 10% aqueous solution) increased from 2 to 4.1. The suspension was dried on a plate (93° C.) overnight. Table 3 shows the chemical analysis of the product.

EXAMPLE 4b

Urea phosphate mother liquid (1.43 kg) of the same quality as in Example 2 was fed into a 2.5-liter reactor provided with agitation and heating. Potassium carbonate (237 g) was fed into the reactor and the suspension was agitated at 60° C. for 40 minutes, so that the pH (a 10% aqueous solution) increased from 2 to 2.7. The suspension was dried in a pan (93° C.) overnight. Table 3 shows the analyses of the end product.

TABLE 3

The chemical analysis of the end product in tests 4a and 4b

|  | Test 4a | Test 4b |
|---|---|---|
| N-kok % | 12.4 | 14.6 |
| $NH_4$—N % | 4.2 | 5.8 |
| Urea-N % | 8.2 | 8.8 |
| $P_2O_5$—KM % | 33.4 | 36.1 |
| $P_2O_5$-ASL | 33.4 | 36.1 |
| $P_2O_5$-VL | 26.2 | 28.2 |
| $K_2O$-KM | 18.6 | 14.2 |
| $H_2O$—KF % | 3.3 | 0.48 |
| pH | 6.6 | 6.5 |

EXAMPLE 5

A product suspension (111° C., pH 5.6, 1400 cP, moisture of 11.9%) that had been made on the continuous-action principle as in Example 1a by using a mother liquid of the same quality as in Test 2, but in a more diluted form (46% of $H_2O$, 8.9% of N, 20.4% of $P_2O_5$, pH 1.7) was allowed to cool to 35° C. and solidify on a plate as a 1.5 cm layer for 35 minutes.

2% of CaO was added to one part and it was ground and fed through an aperture plate. The other part was treated by a corresponding method but without adding CaO. In the starting position, the cooled product contained 10% of moisture. After three hours of drying (60° C.) the sample that included calcium oxide contained 4.7% of moisture and the reference sample, without the addition of CaO, contained 5.2% of moisture.

The untreated sample released all water (an end moisture of 0.3%), when drying was continued for 19 hours. The sample that had been treated with calcium oxide bound part of the water into a non-volatile form (an end moisture of 3.5%).

EXAMPLE 6

As starting material, a mixture was used, which contained scrubber solution from the NPK fertilizer process, and phosphoric acid.

A solution having the composition of a scrubber solution from an NPK process was prepared by preparing a sludge from 2 kg of water and 2 kg of urea-based fertilizer containing 17.2% $P_2O$, 15.4% $K_2$, 13.1% N (urea) and 1.7% N (ammonium). To this solution (sludge), fertilizer grade phosphoric acid was added (Siilinjärvi; 53.6% $P_2O_5$) and the thus obtained starting mixture was heated in a mixed reactor for the evaporation of water during 3 hours, at which point a temperature of 115° C. was reached. The moisture of the obtained sludge was 16% $H_2O$, its viscosity was 20 cP and its pH was 2.5.

To the reactor, 1.8 kg of the starting material mixture was added and the heating was continued for 3.8 hours to a final temperature of 115° C., at which stage the moisture of the obtained sludge was 12% $H_2O$, the viscosity was 3,500 cP and the pH was 4.0. In order to prevent foaming, an anti-foaming agent (Fennodefo 380) had been added.

The sludge was poured on a plate for cooling, and it was immediately solidified. The cooled product was analysed without further drying and the analytical results are shown in Table 4.

TABLE 4

The chemical analysis of the end product of Example 6

| | |
|---|---|
| N-tot % | 6.9 |
| $NH_4$—N % | 5.9 |
| Urea-N % | 1.0 |
| $P_2O_5$-KM % | 40.8 |
| $P_2O_5$-ASL | 36.3 |
| $P_2O_5$-VL % | 32.2 |
| $K_2O$-KM % | 7.4 |
| $H_2O$—KF% | 8.7 |
| pH | 3.8 |

What is claimed is:

1. A method for manufacturing a solid ammonium phosphate and/or urea ammonium phosphate product from the mother liquor of a urea phosphate process or from the scrubber solution of an NPK process, said method comprising the steps of:

a) recovering the mother liquor or the scrubber solution containing or provided with phosphoric acid, to form an aqueous solution containing urea and phosphoric acid;

b) heating and mixing the aqueous solution to remove water by evaporation, decompose the unreacted urea into carbon dioxide and ammonia, evaporate the carbon dioxide, and react the ammonia, alone or together with unreacted urea, with the phosphoric acid into an aqueous suspension of ammonium phosphate and/or urea ammonium phosphate, and c) processing the aqueous suspension further to form a solid ammonium phosphate and/or urea ammonium phosphate product.

2. A method according to claim 1, wherein the molar ratio of the nitrogen of the urea and the phosphorus of the phosphoric acid (N/P) in the solution containing urea and phosphoric acid is >0.85.

3. A method according to claim 1 or 2, wherein the solution containing urea and phosphoric acid is the mother liquor of a urea phosphate process.

4. A method according to claim 1, wherein an alkali metal or alkaline earth metal carbonate, sulphate, oxide, or chloride, in solid form, is added to the reaction mixture to partly neutralize the solution, to bind water, and/or to add nutrients to the end product.

5. A method according to claim 1 or 2, wherein the solution containing urea and phosphoric acid is the scrubber solution of a urea-based NPK process, which contains or to which has been added phosphoric acid.

6. A method according to claim 1, wherein characterized in that the solution containing urea and phosphoric acid is heated at 50–125° C.

7. A method according to claim 6, wherein said solution is heated until the moisture of the formed suspension is 15–20%.

8. A method according to claim 6 or 7, wherein said solution is heated until the pH of the suspension is 2.5–7.

9. A method according to claim 6, wherein the solution is heated until the molar ratio of the nitrogen of the ammonia and the phosphorus phosphor of the phosphate (N/P) in the suspension is about 0.1–1.5:1.

10. A method according to claim 1, wherein, in a first phase, water is evaporated in one or more reactors at about 100° C., until the moisture of the formed suspension is <20% and the pH is 3–5 and, in a second phase, evaporation is continued in one or more reactors at about 110–115° C., until the moisture of the suspension is <10% and its pH is about 6–6.5.

11. A method according to claim 1, wherein the product suspension containing ammonium phosphate and/or urea ammonium phosphate is solidified in the form of a layer of 1–30 mm in thickness, spread on a sheet-iron belt conveyor, which can be heated and/or cooled, and which is heated and/or cooled for 0.01–2 hours, to a final temperature of <50° C.

12. A method according to claim 1, wherein the solidified end product is dried, crushed, ground, and/or granulated.

13. A method according to claim 6, wherein the solution containing urea and phosphoric acid is heated at 100–115° C.

14. A method according to claim 3, wherein the solution containing urea and phosphoric acid is heated until the moisture of the formed suspension is <10%.

15. A method according to claim 3, wherein the solution is heated until the pH of the suspension is 4–6.5.

16. A method according to claim 3, wherein said solution containing urea and phosphoric acid is heated until the molar ratio of the ammonia nitrogen and the phosphate phosphorus (N/P) in the suspension is about 0.85–1.5:1.

17. A method according to claim 3, wherein, in the urea phosphate process, the preparation of urea phosphate has been carried out by reacting, in an aqueous reaction medium, urea and phosphoric acid into urea phosphate, separating the urea phosphate from the aqueous reaction medium by crystallization, and leaving an aqueous mother liquor containing unreacted urea and unreacted phosphoric acid.

18. A method according to claim 11, wherein said product suspension containing is solidified in the form of a layer of 10 mm in thickness spread on a sheet-iron belt conveyor which is heated and/or cooled for 0.05–0.5 hours.

19. A method according to claim 16, wherein said solution containing urea and phosphoric acid is heated until the molar ratio of the ammonia nitrogen and the phosphate phosphorus (N/P) in the suspension is 1.3–1.4:1.

* * * * *